(12) United States Patent
Willer

(10) Patent No.: US 6,836,546 B1
(45) Date of Patent: *Dec. 28, 2004

(54) APPARATUS AND METHOD OF COUPLING HOME NETWORK SIGNALS BETWEEN AN ANALOG PHONE LINE AND A DIGITAL BUS

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,122

(22) Filed: Feb. 1, 2000

Related U.S. Application Data

(60) Provisional application No. 60/163,240, filed on Nov. 3, 1999.

(51) Int. Cl.[7] .................................................. H04M 1/00
(52) U.S. Cl. ............................ 379/399.01; 379/390.02; 379/413.02; 379/413.03
(58) Field of Search ........................ 379/387.01, 390.02, 379/392.01, 399.01, 413.02, 413.03; 375/76; 370/201, 271, 493, 521, 524

(56) References Cited

U.S. PATENT DOCUMENTS

| | | | |
|---|---|---|---|
| 5,050,190 A | * | 9/1991 | Shimada et al. ............. 375/317 |
| 5,093,845 A | * | 3/1992 | Kondoh et al. ............... 375/242 |
| 5,442,630 A | * | 8/1995 | Gagliardi et al. ............ 370/402 |
| 5,841,841 A | * | 11/1998 | Dodds et al. .............. 379/93.08 |
| 6,038,300 A | * | 3/2000 | Hartmann et al. ........... 379/177 |
| 6,259,708 B1 | * | 7/2001 | Cheng et al. ................ 370/493 |
| 6,473,495 B1 | * | 10/2002 | Willer ...................... 379/90.01 |
| 6,522,728 B1 | * | 2/2003 | Willer | |

* cited by examiner

Primary Examiner—Binh Tieu
Assistant Examiner—Tuan Pham
(74) Attorney, Agent, or Firm—Manelli Denison & Selter PLLC; Leon R. Turkevich

(57) ABSTRACT

An arrangement for implementing a network in an ISDN-based customer premises having a four-wire ISDN S0 bus. The ISDN-based customer premises includes a Network Termination Basic Access (NTBA) that interfaces between the residential customer premises and the public switched telephone network by mapping the two-wire ISDN signal onto the four-wire bus. A low pass filter is added to the two-wire send path to eliminate high frequency noise caused by harmonic reflections of the ISDN-based signals on the four-wire bus. Filters are also coupled between each ISDN device and the four-wire S0 bus, ensuring that the four-wire S0 bus is isolated from capacitive influences of the ISDN devices to optimize transmission of the higher frequency home network signals. The two-wire home network signals are also split by S0 transformers for transmission on the two-wire send path and the two-wire receive path of the four-wire S0 bus, effectively increasing the transmission wire radius for improved reception of the home network signals. A high pass filter is coupled between the four-wire S0 bus and analog telephone lines, enabling network stations coupled to the analog telephone lines to exchange home network signals with network stations coupled to the four-wire bus.

12 Claims, 3 Drawing Sheets

APPARATUS AND METHOD OF COUPLING HOME NETWORK SIGNALS BETWEEN AN ANALOG PHONE LINE AND A DIGITAL BUS

This application claims priority from Provisional Application No. 60/163,240, filed filed Nov. 3, 1999.

BACKGROUND OF THE INVENTION

1. Field of the Invention

The present invention relates to network interfacing, and more particularly to methods and systems for controlling transmission of data between network stations connected to a telephone line medium.

2. Background Art

Local area networks use a network cable or other media to link stations on the network. Each local area network architecture uses a media access control (MAC) enabling network interface cards at each station to share access to the media.

Conventional local area network architectures use a media access controller operating according to half-duplex or full duplex Ethernet (ANSI/IEEE standard 802.3) protocol using a prescribed network medium, such as 10BaseT. Newer operating systems require that a network station be able to detect the presence of the network. In an Ethernet 10BaseT environment, the network is detected by the transmission of a link pulse by the physical layer (PHY) transceiver. The periodic link pulse on the 10BaseT media is detected by a PHY receiver, which determines the presence of another network station transmitting on the network medium based on detection of the periodic link pulses. Hence, a PHY transceiver at station A is able to detect the presence of station B, without the transmission or reception of data packets, by the reception of link pulses on the 10BaseT medium from the PHY transmitter at station B.

Efforts are underway to develop an architecture that enables computers to be linked together using conventional twisted pair telephone lines instead of established local area network media such as 10BaseT. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air-conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak to peak voltage on the order of 10 to 20 millivolts, whereas network signals from another network station may have a value on the order of one to two volts. Hence, the amplitude and shape of a received pulse may be so distorted that recovery of a transmitted clock or transmit data from the received pulse becomes substantially difficult.

An additional problem encountered in European telephone systems involves the use of a network termination basic access (NTBA) device, used as an interface between the residential customer premises and a central office of the public switched telephone network for transmission of Integrated Services Digital Network (ISDN)-based signals. In particular, NTBA devices map a two wire ISDN signal from a central office into a four wire S0 bus having a two wire send path and a two wire receive path for sending and receiving the ISDN-based signals throughout a customer premises. The ISDN-based signals generate harmonic reflections on the S0 bus that cause substantial interference with the higher-frequency network signals. Moreover, the zero crossing of an ISDN-based signal interferes substantially with the transmitted network signals, rendering the transmitted network signal unusable due to the harsh conditions on the four wire S0 bus.

In addition, besides NTBA devices there are newer private branch exchanges (PBX) that include an internal four wire S0 bus and up to eight two-wire (e.g., tip and ring) analog connectors for analog telephones. Although these PBX devices provide the flexibility of both a digital S0 bus and analog telephone lines, there is no capability for enabling coupling of home network signals between an end station connected to an analog telephone line, and another end station connected to the digital S0 bus.

SUMMARY OF THE INVENTION

There is need for an arrangement for interconnecting computer end stations in a home telephone network having a network termination basic access (NTBA) device and configured for sending ISDN-based signals between a network node on a four-wire bus and another network node on an analog telephone line, e.g. in a PBX device.

These and other needs are attained by the present invention, where filters are coupled between each ISDN device and the four-wire S0 bus, insuring that the four-wire S0 bus is isolated from capacitive influences of the ISDN devices. Moreover, a high pass filter couples analog telephone lines to the S0 bus to enable transmission of home network signals between two-wire analog phone lines and to the four-wire digital S0 bus.

One aspect of the present invention provides a method of implementing a local area network in a home telephone network having a connector, configured for sending and receiving ISDN-based signals to and from a public switched telephone network, and a four-wire bus. The four-wire bus includes a two-wire send path and a two-wire receive path for sending and receiving the ISDN-based signals, respectively, between the connector and connected ISDN terminal devices. The method includes connecting a high pass filter between the four-wire bus and a two-wire analog telephone line configured for transmitting analog telephone signals, and transmitting network data signals between a first network node coupled to the four wire bus and a second network node coupled to the two-wire analog telephone line. Connection of the high pass filter between the four-wire bus and the two-wire analog telephone line enables the high frequency network data signals to be transmitted between the four-wire bus and the two-wire analog telephone line, without interference of telephone signals on the respective two-wire bus and two-wire analog telephone line.

A particular feature of this aspect includes isolating capacitive influences of each of the connected ISDN terminal devices from the t-two-wire send path. The isolation of capacitive influences of each of the connected ISDN terminal devices insures that the circuitry within the ISDN terminal devices do not induce any capacitive loads onto the two-wire send path that may adversely affect transmission of the home network signals.

Another aspect of the present invention provides a computer network. The computer network includes a connector configured for sending and receiving ISDN-based signals to and from a public switched telephone network. The computer network also includes a four-wire bus having a two-wire send path and a two-wire receive path for sending and receiving the ISDN-based signals between the connector and ISDN terminal devices. A low pass filter, coupled between the two-wire send path and the connector, is configured for isolating capacitive influences of the connector from the two-wire send path and filtering ISDN harmonic signals occurring substantially at the frequencies of network data signals. The computer network also includes ISDN terminal filters, each configured for isolating capacitive influences of a corresponding one of the ISDN terminal devices from the two-wire send path, and first and second end stations configured for exchanging the network data signals at frequencies substantially higher than the ISDN-based signals via at least one of the two-wire send path and the two-wire receive path, wherein the first end station is coupled to at least one of the two-wire send path and the two-wire receive path and the second end station is coupled to an analog telephone line. The computer network also includes a high pass filter for coupling the four-wire bus to the analog telephone line, enabling the second end station to exchange the network data signals via the analog telephone line and the four-wire bus.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment provides a high pass coupling filter configured for coupling home network signals between analog phone lines and an S0 bus in an ISDN-based customer premises networking system. A description will first be provided of the ISDN-based customer premises networking system, followed by a detailed description of the high pass coupling filter.

Figure 1:
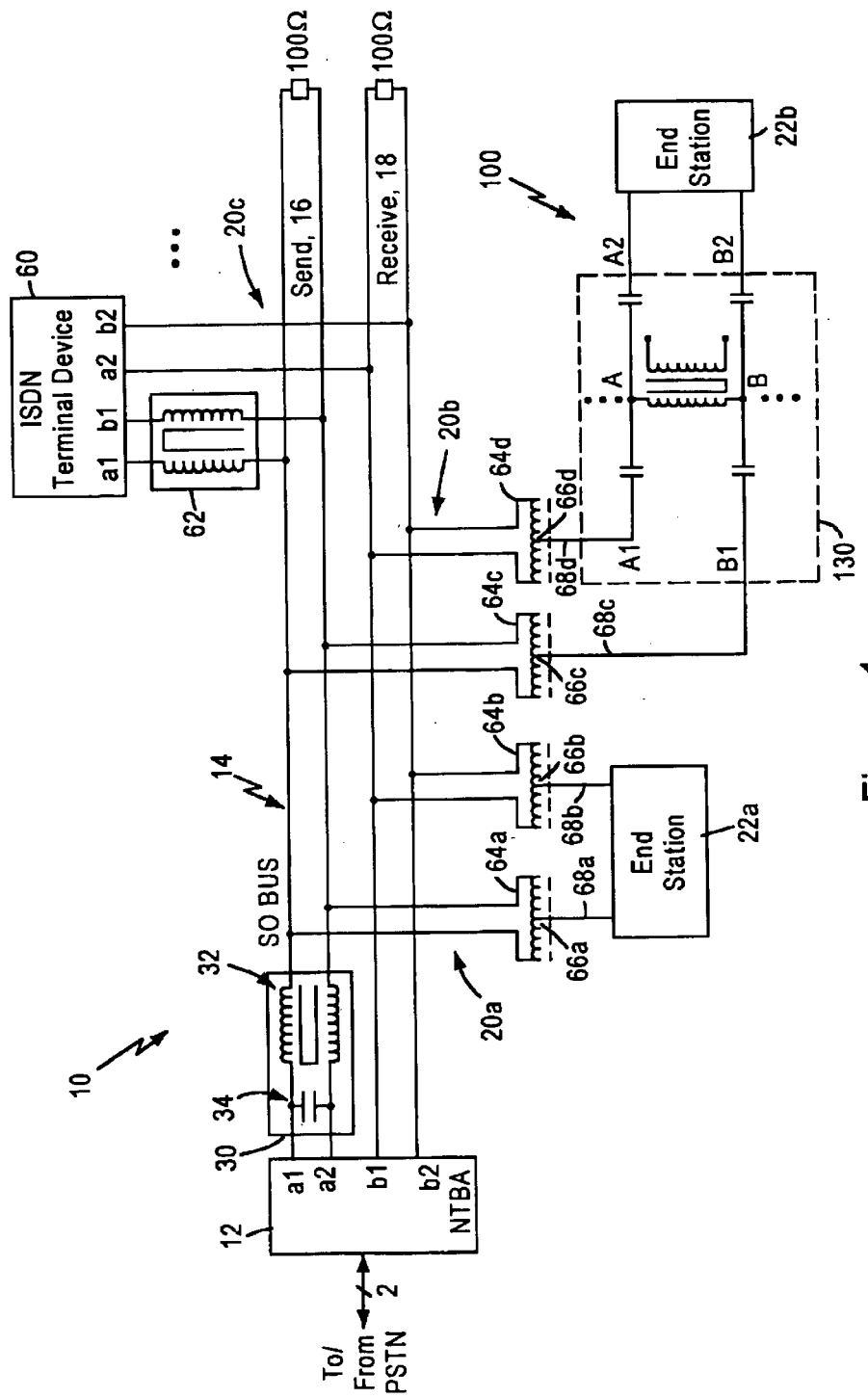
FIG. 1 is a block diagram illustrating a computer network implemented in a customer premises having ISDN-based wiring according to an embodiment of the present invention.

FIG. 1 is a block diagram illustrating an Ethernet (IEEE 802.3) local area network 10 implemented in a home environment using ISDN-based signals according to an embodiment of the present invention. As shown in FIG. 1, the home environment includes a network termination basic access (NTBA) device 12, configured for sending and receiving Integrated Services Digital Network (ISDN) signals to and from a public switched telephone network via a two-wire twisted pair: As recognized in the art, the NTBA device 12 is configured for outputting ISDN signals onto a four-wire S0 bus 14, having two wires for a send path 16 and two wires for a receive path 18. Typically implemented in European households, the S0 bus fourteen may have multiple connections, or "taps" 20 connected in parallel off the S0 bus 14. In addition, the S0 bus may be internal to a PBX system; as such, the NTBA 12 serves as a connector for the S0 bus 14 to the two-wire twisted pair from the public switched telephone network.

Conventional networking technologies assume a Category 5 twisted pair medium for transmission of network signals as differential signals. In the disclosed ISDN environment, however, the NTBA 12 maps the ISDN signals into a two-wire send path 16, and a two-wire receive path 18. As recognized in the art, the receive path 18 reflects the ISDN signal transmitted on the send path 16, with a 2-bit spacing relative to the ISDN clock frequency of about 200 kHz (e.g., 192 kHz). Hence, due to the high level of ISDN noise in the frequency used for home networking, referred to as home PNA by the Home Phone Network Alliance, transmissions of home PNA data on the ISDN S0 bus 14 is normally not possible.

According to the disclosed embodiment, a low pass filter 30 is installed in the send path 16 of the NTBA 12. The low pass filter 30 is illustrated as external to the NTBA 12, although the low pass filter 30 may also be integrated internally within the NTBA 12; in either case, the low pass filter 30 will be coupled to the output terminal of the NTBA device 12, either internally or externally.

The low pass filter 30 includes an inductor 32 (e.g., 2×4.7 millihenries) and a capacitor 34 (e.g., 1 nanofarad) that attenuates the high frequency noise caused by the harmonics of the 192 kHz ISDN signal. Hence, the send path 16 and receive path 18 are free of high frequency harmonics that may affect die home network signals between end stations 22a and 22b. In addition, the inductor 32, implemented for example as a common mode choke, isolates capacitive influences of the NTBA 12 from the two-wire send path 16, enabling the high frequency home network signals to be transmitted without capacitive loading by the NTBA 12.

As described above, capacitive loading may also be induced by circuitry of ISDN terminal devices 60 coupled to the S0 bus 14. Hence, the disclosed network 10 also includes ISDN terminal filters 62 configured for isolating capacitive influences of each of the connected ISDN terminal devices 60 from the two-wire send path 16. Each ISDN terminal filter 62 is preferably implemented as a common mode choke (e.g., 2×4.7 millihenries) which is connected between the corresponding ISDN terminal device 60 and the two wire send path 16.

Hence, the low pass filter 30 and the ISDN terminal filters 62 isolate capacitive influences of the respective ISDN devices from the two-wire send path 16, providing optimal conditions for transmission of the home network signals having a frequency of at least about 7.5 MHz.

An additional feature of the disclosed embodiment is that each end station 22 is coupled to a pair of commercially-available S0 transformers 64, for example from Vogt Electronic AG of Erlau, Germany. Specifically, the 4-wire tap 20a of end station 22a is coupled to the ends of the primary windings of transformers 64a and 64b. The 4-wire tap 20b couples the analog telephone line 100, described below, to the end of the primary windings of transformers 64c and 64d. Note that the secondary windings of transformers 64a, 64b, 64c, and 64d are not used. Each primary winding includes a middle tap 66, coupled substantially in the middle (i.e., substantially the center) of the corresponding primary winding. Hence, the ends of transformers 64a and 64b are symmetrically connected to the two wires a1, b1 of the send direction 16 and the two wires a2, b2 of the S0 bus 14, respectively. Similarly, the ends of transformers 64c and 64d are symmetrically connected to the two wires a1, b1 of the send direction 16 and the two wires a2, b2 of the S0 bus 14, respectively.

Each end station 22 outputs the home network signal as a two-wire signal (i.e., a differential signal pair) on two-wire signal lines 68; hence the end station 22a sends and receives the differential home network signals on signal lines 68a and 68b, and the end stations having two-wire analog telephone lines 100 and coupled to the high pass filter 130 (e.g., end station 22b) send and receive the differential home network signals on the signal lines 68c and 68d.

As shown in FIG. 1, the signal lines 68a, 68b, and 68c, and 68d are coupled to the middle taps 66a, 66b, 66c, and 66d, respectively, enabling the two-wire home network signal to be transferred across the four-wire S0 bus 14. Hence, the end station 22 outputs a first home network signal to the middle tap 66a of the primary winding 64a coupled to the send path 16, and a second home network signal complementary to the first home network signal (i.e., the corresponding differential signal), to the middle tap 66b of the primary winding 64b coupled to the receive path 18. Hence, the end station 22b receives the first home network signal from the send path 16, and the second home network signal from the receive path 18, resulting in substantially improved reception of the home network signal by optimizing of the loop resistance of the bus 14. Experimental testing of the disclosed arrangement has resulted in successful reception of 7.5 MHz home network signals on an S0 bus 14 where the end stations 22 transmit the home network signals across a distance of about 80 meters.

The high pass filter 130 couples signal lines 68c and 68d to the analog two-wire telephone lines 100, enabling the end station 22b to send home network signals to the end station 22a via the four-wire S0 bus 14. In addition, the high pass filter 130 rejects the lower frequency ISDN and analog telephone signals, ensuring that there is no interference between the digital signals of the four-wire bus 14 and the analog signals of the two-wire telephone line 100.

Figure 2:
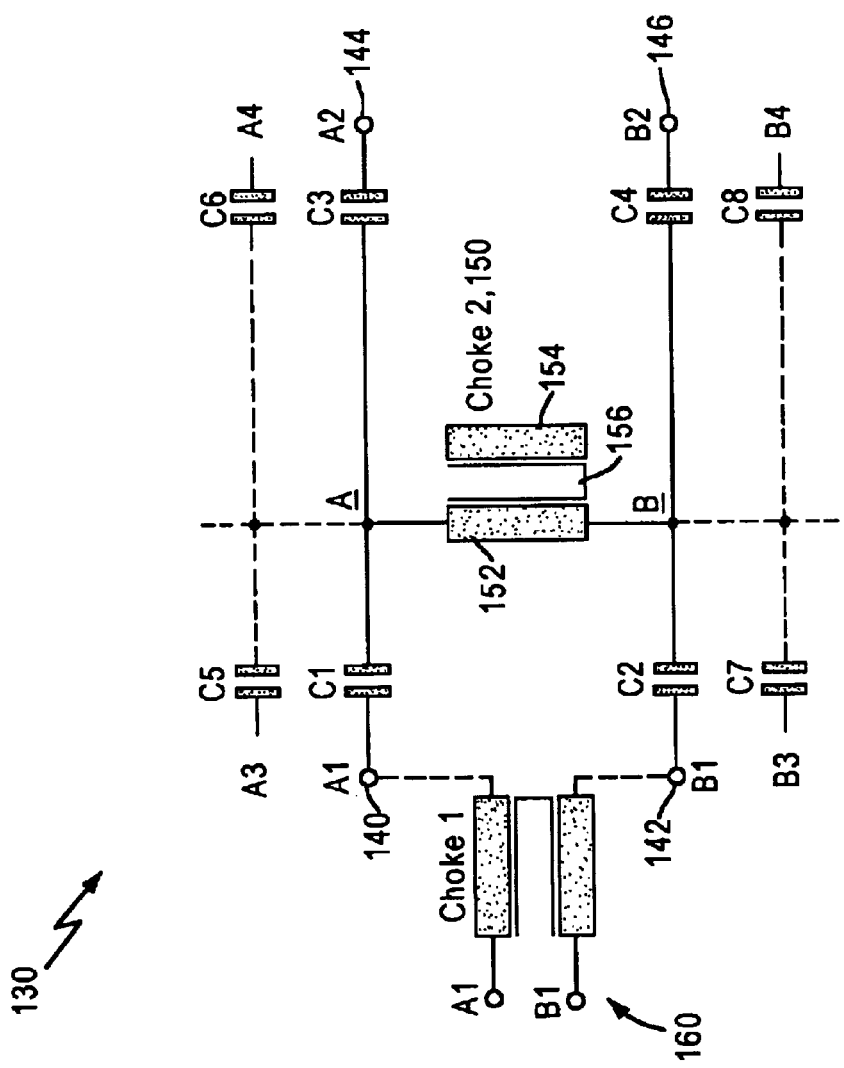
FIG. 2 is a diagram illustrating in detail the high pass filter of FIG. 1 according to an embodiment of the present invention.

FIG. 2 is a block diagram illustrating in detail the high pass filter 130 according to an embodiment of the present invention. As shown in FIG. 2, the high pass filter 130 includes connectors 140, 142, 144, and 146 for connecting the signal lines 68d, 68c and the two-wire analog lines 100 at terminal ends A1, B1, A2, and B2, respectively. Hence, the connectors 140 and 142 establish a high pass filter across signal lines 68c and 68d, and connectors 144 and 146 establish a high pass filter across the two-wire analog lines 100.

In particular, a high pass filter is formed across the connections A1 and B1 based on the capacitors C1 and C2, and the inductance element 150, shown as a choke. In particular, the choke 150 includes a first winding 152 coupled to nodes A and B. The nodes A and B of high pass filter 130 are capacitively coupled to a corresponding one of the telephone lines 100 for each twisted pair. For example, the node A is capacitively coupled to terminal connections A1, A2, A3, ... A7 and node B is capacitively coupled to connections and B1, B2, B3, ... B7. Hence, the first winding 152 provides an inductive load across all the associated twisted pair telephone wires 100 resulting in connection of the twisted pair wires for transmission of network data signals.

As shown in FIG. 2, the choke 150 also includes a second winding 154 that is galvanically isolated from the first winding. Since the second winding 154 is inductively coupled to the first winding 152 via the core 156, the inductive coupling generates a copy of the transmitted network data signals onto the second winding 154. Hence, the terminal ends of the second winding 154 may be used for additional monitoring of the transmit network data signals passing through the first winding 152 without adding any additional distortion to the network medium.

In some cases the capacitance between terminals A and B maybe substantially high as to cause a short-circuit for high frequency signals between the two nodes. In such a case, the high pass filter circuit 130 also includes a second high inductance device 160, labeled as choke 1, which is inserted between the terminal ends 140 and 142 and the actual terminal connections A1 and B1 of lines 64d and 64c. In this case, the high inductance device 160 compensates for the high capacitance, limiting the possibility of a short-circuit or loss in performance for the high frequency network signals.

Figure 3:
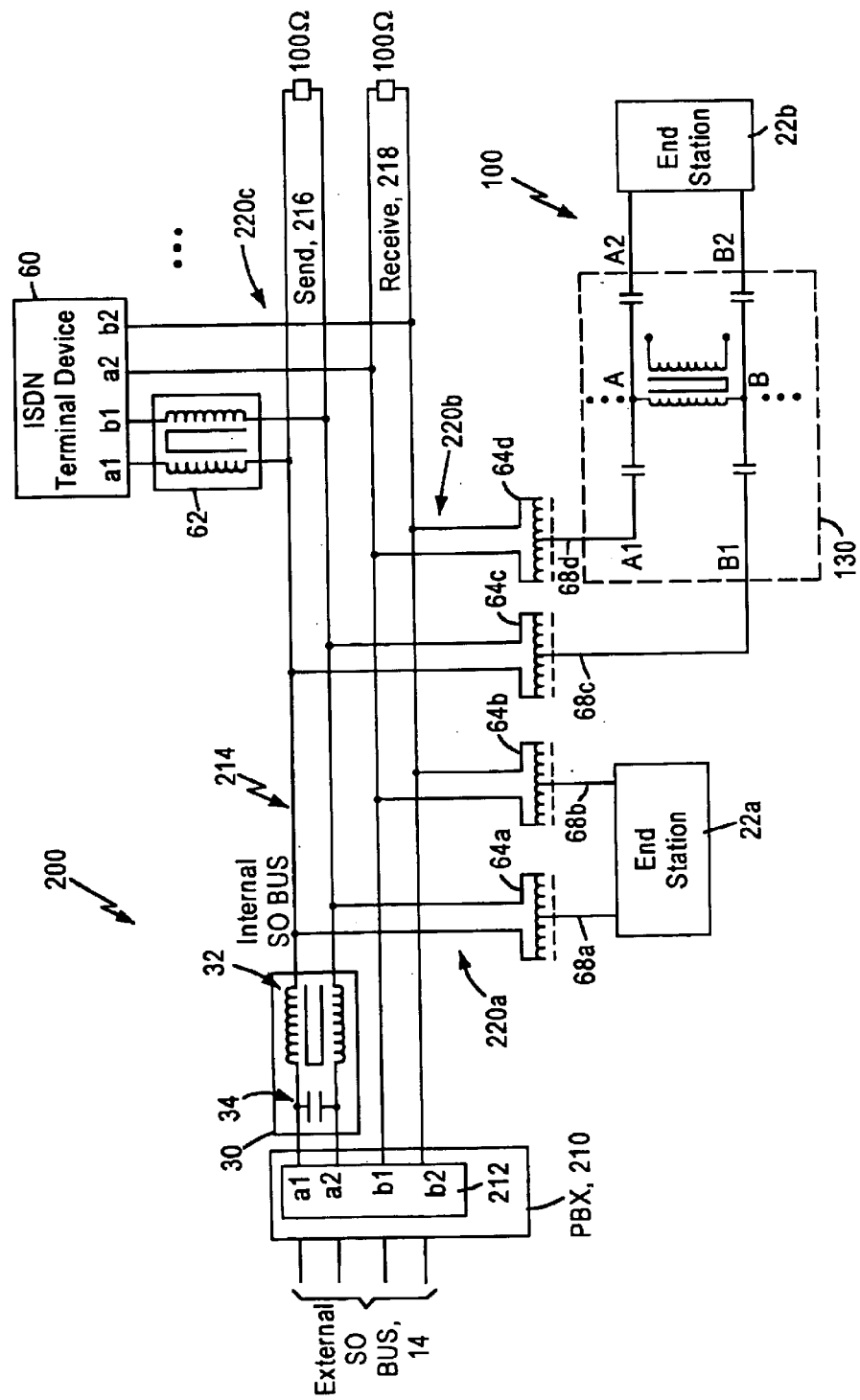
FIG. 3 is a diagram illustrating another computer network implemented in a customer premises having a PBX system according to an embodiment of the present invention.

FIG. 3 is a diagram illustrating an alternative implementation of the local area network 10 of FIG. 1 according to another embodiment of the present invention. As shown in FIG. 3, the network 200 includes a private branch exchange (PBX) 210. The PBX 210 includes an internal connector 212 for an internal S0 bus 214 having a send path 216 and a receive path 218. The internal connector 212 has circuitry that is configured for connecting the internal S0 bus 214 to the S0 bus 14 (also referred to as the external S0 bus) for communication with the public switched telephone network. As recognized in the art, the PBX 210 will typically have four to eight analog (tip-and-ring) connectors (not shown), one external connector for connection to the external S0 bus, and up to eight digital connections off the internal S0 bus 214.

The local area network 10 includes the same filters 30 and 62 described above with respect to 111 FIG. 1, and also includes taps 220 connected in parallel off the internal S0 bus 214 for connection to an ISDN terminal device 60, a home network end station 22a coupled to the internal S0 bus 214, or an end station 22b coupled to the internal S0 bus 214 via two-wire analog telephone lines 100 and the high pass coupling filter 130. In this regard, the features of providing a high pass coupling filter 130 between analog phone lines and an S0 bus may also be applied to a PBX system 210. Although the filter 30 is illustrated as external to the PBX 210, the filter 30 may also be integrated within the PBX 210.

According to the disclosed embodiment, a high pass filter is added between the four-wire bus and a two-wire analog telephone line, enabling network data signals to be transmitted between a first network node coupled to the four wire bus and a second network node coupled to the two-wire analog telephone line. Hence, home networking technologies may be implemented in residential premises, regardless of whether the end station is connected to an analog telephone line or the four-wire bus.

While this invention has been described with what is presently considered to be the most practical preferred embodiment, it is to be understood that the invention is not limited to the disclosed embodiments, but, on the contrary, is intended to cover, various modifications and equivalent arrangements included within the spirit and scope of the appended claims.

What is claimed is:

1. A method of implementing a local area network in a home telephone network having a connector, configured for sending and receiving ISDN-based signals to and from a public switched telephone network, and a four-wire bus including a two-wire send path and a two-wire receive path for sending and receiving the ISDN-based, signals, respectively, between the connector and connected ISDN terminal devices, the method comprising:

connecting a high pass filter between the four-wire bus and a two-wire analog telephone line configured for transmitting analog telephone signals; and transmitting network data signals between a first network node coupled to the four wire bus and a second network node coupled to the two-wire analog telephone line.

2. The method of claim 1, further comprising isolating capacitive influences of each of the connected terminal devices from the two-wire send path by adding a common mode choke between each corresponding ISDN terminal device and the two-wire send path.

3. The method of claim 2, wherein the transmitting step includes:

coupling a first home network signal to a middle tap of a primary winding of a first S0 transformer coupled to the two-wire send path; and coupling a second home network signal to the middle tap of the primary winding of a second S0 transformer coupled to the two-wire receive path.

4. The method of claim 3, further comprising receiving by the second network node the first and second home network signals, comprising:

receiving the first home network signal from the middle tap of the primary winding of a third S0 transformer coupled to the two-wire send path;

receiving the second home network signal from the middle tap of the primary winding of a fourth S0 transformer coupled to the two-wire receive path; and passing the first and second home network signals through the high pass filter to the second network node via the two-wire telephone line.

5. The method of claim 4, wherein the transmitting step includes transmitting the first and second home network signals to the second network node across a distance of about 80 meters.

6. The method of claim 1, wherein the transmitting step includes:

coupling a first home network signal to a middle tap of a primary winding of a first S0 transformer coupled to the two-wire send path; and coupling a second home network signal to the middle tap of the primary winding of a second S0 transformer coupled to the two-wire receive path.

7. The method of claim 6, further comprising receiving by the second network node the first and second home network signals, comprising:

receiving the first home network signal from the middle tap of the primary winding of a third S0 transformer coupled to the two-wire send path; and receiving the second home network signal from the middle tap of the primary winding of a fourth S0 transformer coupled to the two-wire receive path; and passing the first and second home network signals through the high pass filter to the second network node via the two-wire telephone line.

8. A computer network comprising:

a connector configured for sending and receiving ISDN-based signals to and from a public switched telephone network;

a four-wire bus having a two-wire send path and a two-wire receive path for sending and receiving the ISDN-based signals between the connector and ISDN terminal devices;

a low pass filter, coupled between the two-wire send path and the connector, for isolating capacitive influences of the connector from the two-wire send path and filtering ISDN harmonic signals occurring substantially at the frequencies of network data signals;

ISDN terminal filters, each configured for isolating capacitive influences of a corresponding one of the ISDN terminal devices from the two-wire send path;

first and second end stations configured for exchanging the network data signals at frequencies substantially higher than the ISDN-based signals via at least one of the two-wire send path and the two-wire receive path, the first end station coupled to at least one of the two-wire send path and the two-wire receive path and the second end station coupled to an analog telephone line; and a high pass filter for coupling the four-wire bus to the analog telephone line, the second end station exchanging the network data signals via the analog telephone line and the four-wire bus.

9. The computer network of claim 8, further comprising first and second S0 transformers configured for coupling the first end station to the two-wire send path and the two-wire receive path, respectively, each of the first and second S0 transformers having a primary winding coupled to the corresponding two-wire path, each primary winding having a middle tap path configured for coupling to a corresponding network data signal differential input of the first end station.

10. The computer network of claim 9, further comprising third and fourth S0 transformers configured for coupling the high pass filter to the two-wire send path and the two-wire receive path, respectively, each of the third and fourth S0 transformers having the primary winding coupled to the corresponding two-wire path and having the middle tap path configured for coupling to a corresponding terminal end of the high pass filter.

11. The computer network of claim 10, wherein the first and second end stations exchanging the network data signals across the two-wire send path and the two-wire receive path have a transmission distance of about 80 meters.

12. The computer network of claim 8, wherein the four-wire bus is an internal S0 bus of a private branch exchange.

* * * * *

UNITED STATES PATENT AND TRADEMARK OFFICE
CERTIFICATE OF CORRECTION

PATENT NO.    : 6,836,546 B1
DATED         : December 28, 2004
INVENTOR(S)   : Willer It is certified that error appears in the above-identified patent and that said Letters Patent is hereby corrected as shown below:

<u>Column 7,</u>
Line 10, delete the comma after "ISDN-based"

Signed and Sealed this

Twelfth Day of April, 2005

JON W. DUDAS
*Director of the United States Patent and Trademark Office*